United States Patent [19]

Makino et al.

[11] Patent Number: 5,272,695
[45] Date of Patent: Dec. 21, 1993

[54] SUBBAND ECHO CANCELLER WITH ADJUSTABLE COEFFICIENTS USING A SERIES OF STEP SIZES

[75] Inventors: Shoji Makino, Machida; Yoichi Haneda, Chofu; Yutaka Kanesa, Tanashi, all of Japan

[73] Assignee: Nippon Telegraph and Telephone Corporation, Tokyo, Japan

[21] Appl. No.: 756,622

[22] Filed: Sep. 9, 1991

[30] Foreign Application Priority Data

Sep. 14, 1990 [JP] Japan .................................. 2-245187

[51] Int. Cl.$^5$ .............................................. H04J 1/00
[52] U.S. Cl. .................................. 370/32.1; 379/410; 370/70
[58] Field of Search .................... 370/32.1, 70; 375/34, 375/103; 379/406, 407, 410, 411

[56] References Cited

U.S. PATENT DOCUMENTS

| | | | |
|---|---|---|---|
| 4,129,753 | 12/1978 | Duttweiler | 379/410 |
| 4,349,889 | 9/1982 | van den Elzen et al. | 370/32.1 |
| 4,682,358 | 7/1987 | Werner | 379/410 |
| 4,956,838 | 9/1990 | Gilloire et al. | 370/32.1 |
| 5,136,577 | 8/1992 | Amano et al. | 370/32.1 |
| 5,146,470 | 9/1992 | Fujii et al. | 375/103 |

OTHER PUBLICATIONS

Steven L. Gay and Richard J. Mammone, "Fast Converging Subband Acoustic Echo Cancellation Using RAP on the WE® DSP16A," ICASSP 90, Apr. 3–6, 1990: 1141–1144.

Primary Examiner—Douglas W. Olms
Assistant Examiner—Shick Hom
Attorney, Agent, or Firm—Pollock, Vande Sande and Priddy

[57] ABSTRACT

A received input signal and an echo signal resulting from the passage of the received input signal through an echo path are both analyzed or divided into a plurality of common subbands. The received input signal in each subband is supplied to an estimated echo path provided in the subband, by which it is rendered into an echo replica signal. The echo replica signal is subtracted, by a subtractor provided in each subband, from the echo signal in the same subband as the echo replica signal to obtain a residual echo signal. The residual echo signals in the respective subbands are synthesized into a fullband residual echo signal. The estimated echo path in each subband is formed by a digital FIR filter and its filter coefficients are calculated by a coefficient calculation part in the subband, based on the received input signal, the residual echo signal and a step size matrix. The filter coefficients are iteratively updated so that the residual echo signal in each subband may be minimized. The step size matrix is used to define the step size of the filter coefficients and is determined by an acoustic field characteristics calculation part, based on the variation characteristics of an impulse response of the echo path in each subband.

13 Claims, 13 Drawing Sheets $f_s$ : SAMPLING FREQUENCY

SUBBAND ECHO CANCELLER WITH ADJUSTABLE COEFFICIENTS USING A SERIES OF STEP SIZES

BACKGROUND OF THE INVENTION

The present invention relates to an echo canceller for cancelling an echo signal which causes howling and constitutes an impediment to hearing in a 2-wire/4-wire conversion system and a hands-free telecommunication system.

With the spread of satellite communications and audio teleconferences, there has been a strong demand for telecommunication equipment which possesses excellent simultaneous conversation performance and suppresses echoes well. Echo cancellers have been proposed to meet such requirements. FIG. 1 is a block diagram showing a conventional echo canceller disclosed in Japanese Patent Application Laid Open No. 220530/89, the echo canceller being shown to be applied to hands-free telecommunication. In a telecommunication system including a receiving system from a receive input end 1 to a loud speaker 2 for receiving an input signal x(t) from a microphone (not shown) disposed at a different site and a sending system from a microphone 3 via a send out end 4 to a loud speaker (not shown) disposed at the above-mentioned different site, the received input signal x(t) is sampled by an analog-to-digital (hereinafter referred to simply as A/D) converter 8 and the sampled received input signal x(n) is supplied to an estimated echo path 7 from the loud speaker 2 to the microphone 3 which approximates an echo path Pe of an impulse response h(t). On the other hand, an echo signal y(t), which has reached the microphone 3 via the echo path Pe from the loud speaker 2, is sampled by an A/D converter 5 into an echo signal y(n) and an echo replica signal $\hat{y}(n)$ from the estimated echo path 7 is subtracted by a subtractor 9 from the echo signal y(n) to cancel the latter.

It is necessary that the estimated echo path 7 follow up temporal variations of the echo path Pe. In the above-said example the estimated echo path 7 is formed by a digital finite impulse response (hereinafter referred to simply as FIR) filter and its filter coefficients are iteratively adjusted by a coefficient calculation part 6 using, for example, a least mean square algorithm (hereinafter referred to simply as LMS algorithm), normalized LMS algorithm, or affine projection algorithm so that the residual echo $e(n) = y(n) - \hat{y}(n)$ may approach zero. By such adjustment of the estimated echo path 7, optimum echo cancellation is maintained at all times.

FIG. 2 shows, by way of example, the internal construction of the coefficient calculation part 6 which employs an exponentially weighted step size algorithm (hereinafter referred to simply as ES algorithm) set forth in the above-mentioned Japanese Patent Application or a literature, S. Makino et al., "Acoustic Echo Canceller Algorithm based on the Variation Characteristics of a Room Impulse Response," IEEE 1990 International Conference on Acoustics, Speech, and Signal Processing, pp. 1133-1136. Received input signals x(n) are sequentially written into a received input signal storage 14, the contents of which are updated so that it always holds the same number of the latest sample values as the number of taps of the FIR filter. All the received input signals held in the storage 14 are handled as a vector x(n) and $=x(n)=^2$ is calculated in a norm calculator 13. In a step size matrix storage 12 is stored a step size matrix A which is a diagonal matrix. In the case where the estimated echo path 7 is formed by the above-mentioned digital FIR filter, its filter coefficients $\hat{n}(n)$ are a direct simulation of a room impulse response h(t). Consequently, the values of adjustment of the filter coefficients which are required in accordance with the variation of the echo path Pe coincide with the amount of variation of the room impulse response h(t). Then, the step size matrix A, which represents the step in the filter coefficient adjusting operation, is weighted in terms of a temporal variation characteristic of the impulse response h(t). In general, the impulse response in a room sound field undergoes an exponential attenuation, and also when the impulse response varies in response to a movement of an object in the sound field, the impulse response is exponentially attenuated and the difference between its values before and after the variation also has an exponential attenuation characteristic. That is, the amount of variation of the impulse response can be represented as an exponential function using an attenuation ratio $\gamma$. Accordingly, the value of each of the diagonal elements (hereinafter referred to simply as a step size) $\alpha_i (i=1, 2, \ldots, L$, where L is the filter order) of the step size matrix A is chosen so that as i increases, it exponentially attenuates from $\alpha_{max}$ with the same slope as that of the exponential attenuation characteristic of the impulse response and gradually approaches $\alpha_{min}$ as shown in FIG. 3. The signals x(n), $=x(n)=^2$ and e(n) and the step size matrix A are provided to an adjusting value calculation part 15 to calculate $$A \frac{e(n)}{||x(n)||^2} x(n) \quad (1)$$

The calculated output is applied to an adder 16, wherein it is added to the filter coefficients $\hat{n}(n)$ from a filter coefficient storage 11 to obtain $\hat{n}(n+1)$. The added output $\hat{n}(n+1)$ is provided to the estimated echo path 7 and, at the same time, it is supplied to the filter coefficient storage 11 to update its stored values. By such operations as mentioned above, the impulse response $\hat{n}(n)$ of the estimated echo path 7 is iteratively adjusted following Eq. (2) to approach the impulse response h(t) of the true echo path Pe.

$$\hat{n}(n + 1) = \hat{n}(n) + A \frac{e(n)}{||x(n)||^2} x(n) \quad (2)$$

In the above, $A = \text{diag}[\alpha_1, \alpha_2, \ldots, \alpha_L]$, the step size matrix; $\alpha_i = \alpha_0 \gamma^{i-1}$ ($i = 1, 2, \ldots, L$); $\gamma$ is the exponential attenuation ratio of the amount of variation of the impulse response; L is the filter order; $\hat{n}(n) = (\hat{n}_1(n), \hat{n}_2(n), \ldots, \hat{n}_L(n))^T$, the impulse response of the estimated echo path, i.e. coefficients of the FIR filter; e(n) is an estimated error ($= y(n) - \hat{y}(n)$), i.e. the residual echo; $x(n) = (x(n), x(n-1), \ldots, x(n-L+1))^T$, the vector of the received input signal; and T is the transpose of the vector. A necessary and sufficient condition for the convergence of Eq. (2) with white noise is that the mean $\bar{\alpha}$ of L step sizes $\alpha_i$ ($i = 1, 2, \ldots, L$) is between 0 and 2 as expressed by the following equation (3):

$$0 < \bar{\alpha} = \frac{1}{L} \sum_{i=1}^{L} \alpha_i < 2 \quad (3)$$

For a speech signal a sufficient condition of the following equation (4) is used.

$$0 < \alpha_i < 2 (i=1, 2, \ldots, L) \quad (4)$$

The mean value $\bar{\alpha}$ influences the convergence rate; namely, when the mean value $\bar{\alpha}$ is 1, the convergence rate is maximum and as the mean value becomes smaller than 1, the convergence rate decreases. Further, the mean value $\bar{\alpha}$ defines the final steady-state echo return loss enhancement (ERLE) as expressed below by the following equation (5):

$$\text{steady-state } ERLE = 10 \log_{10} \left( \frac{2}{\bar{\alpha}} - 1 \right) + SNR(\text{dB}) \quad (5)$$

Where SNR is the SN ratio between the echo signal y(n) in the microphone 3 and ambient noise. From Eq. (5) it can be seen that the steady-state ERLE increases as the mean value $\bar{\alpha}$ decreases.

This algorithm utilizes an acoustic finding that when the impulse response varies with a movement of a man or object, the amount of variation (i.e. the difference in the impulse response) exponentially attenuates with the same attenuation ratio as that of the impulse response. By adjusting coefficients in large steps at an early stage of the impulse response of a great change and adjusting coefficients in small steps at a latter stage of the impulse response of a slight change, it is possible to offer an echo canceller of high convergence speed.

In conventional algorithms the step size matrix is weighted by the variation characteristic of the impulse response over the full band. However, this poses a problem that the convergence rate decreases under some conditions of the echo path.

On the other hand, there has been proposed by S. Gay et al. such a system as shown in FIG. 4, in which the received input signal x(t) is analyzed or divided by a subband analysis circuit 17 into a plurality of subbands where frequency components can be regarded substantially flat; the aforementioned estimated echo path $7_k$ and coefficient calculation part $6_k$ for calculating its impulse response ĥ(n) are provided for each subband; the echo signal y(t) is similarly analyzed or divided by a subband analysis circuit 18 into the above-mentioned subbands; the output echo replica signal from the estimated echo path $7_k$ is subtracted from the divided echo signal by the aforementioned subtractor $9_k$ for each corresponding subband to obtain the residual echo signal; the coefficients of the filter forming the estimated echo path $7_k$ are adjusted by the coefficient calculation part $6_k$ so that the residual echo signal may be minimized; and the residual echo signals in the respective subbands are combined or synthesized by a subband synthesis circuit 19 into a composite residual echo signal e(t) of the full band (S. Gay et al., "Fast Converging Subband Acoustic Echo Cancellation Using RAP on the WE DSP 16A," IEEE 1990 International Conference on Acoustics, Speech, and Signal Processing, pp. 1141-1144). In this case, however, each coefficient calculation part $6_k$ does not use the step size matrix A for the calculation of Eq. (2) but instead uses a constant $\alpha$ (scalar) common to all the subbands. This method reduces the amount of computation for echo cancellation, by dividing the received input signal into a plurality of subbands and increases the convergence speed of the impulse response ĥ(n) according to the iterated calculation of Eq. (2) by whitening the received input signal analyzed into each subband, but it cannot be said that a satisfactory convergence speed has been achieved.

SUMMARY OF THE INVENTION

It is therefore an object of the present invention to provide an echo canceller of a high impulse response convergence speed.

According to the principles of the present invention, the technique of adjusting a greatly-varying portion and a slightly-varying portion of the impulse response of an echo path in large step sizes and in small step sizes, respectively, is developed to the frequency characteristic itself based on the present inventors' idea that the reduction of the convergence speed in the ES algorithm is attributable to the fact that the variation characteristic of the impulse response has a frequency characteristic. The impulse response of the echo path in a sound field is analyzed or divided into a plurality of subbands. The echo canceller of the present invention is formed reflecting the variation characteristics (the exponential attenuation ratio (the slope) and the amount of variation (the magnitude)) of the impulse response in each subband. With such a construction, it is possible to implement an echo canceller of a high impulse response convergence speed, reflecting the frequency characteristics of variation in the impulse response of the echo path in a sound field.

According to the present invention, a signal is divided into a plurality of subbands, and in each subband an estimated echo path and a coefficient calculation part for determining its impulse response are provided. Each coefficient calculation part has a step size storage, to which is applied a step size matrix which is determined by the variation characteristic of the impulse response of the echo path in the sound field in the corresponding subband. The step size matrix in each subband determines the magnitudes of adjustment of the filter coefficients which are called for in accordance with variations of the sound-field echo path in the corresponding subband.

With the present invention of such a constitution, the frequency characteristic of the amount of variation in the impulse response can be reflected in the values of adjustment for the estimated echo path in each subband, and hence the echo canceller of the present invention has a high impulse response convergence speed.

DESCRIPTION OF THE PREFERRED EMBODIMENTS

Figure 1:
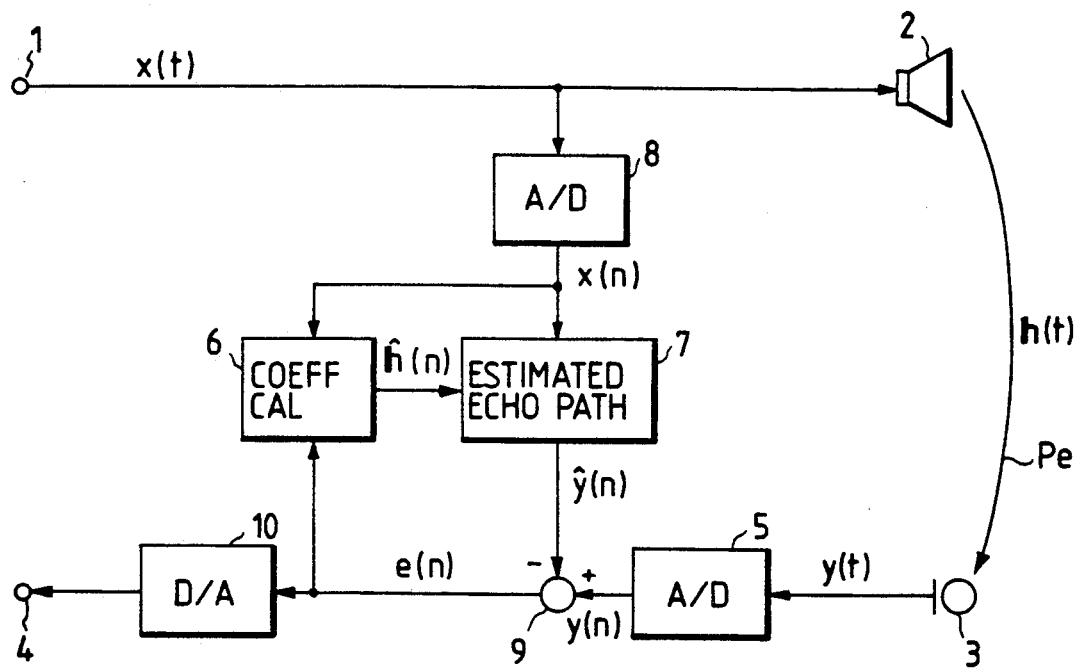
FIG. 1 is a block diagram showing an example of conventional echo cancellers.
Figure 4:
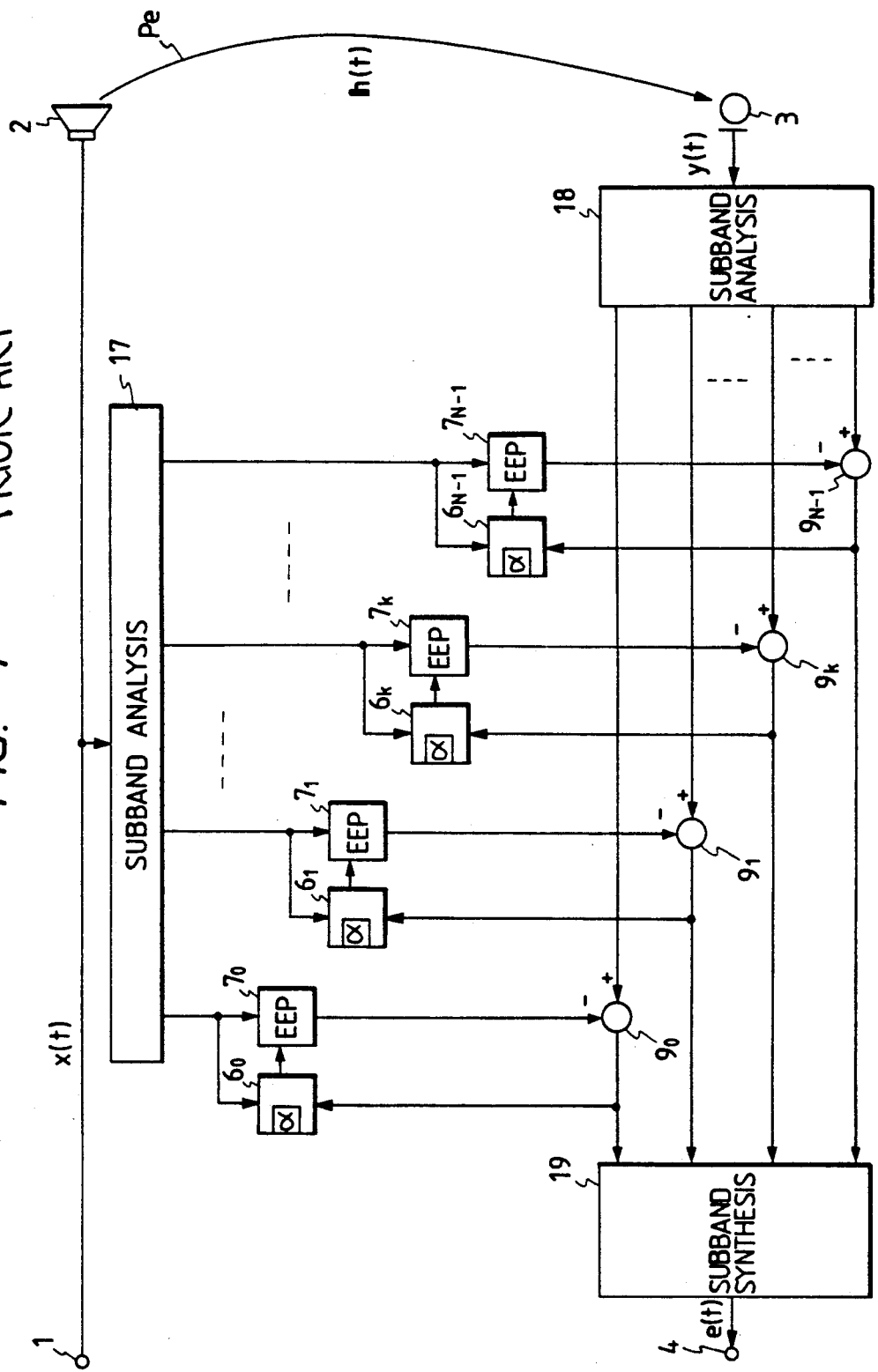
FIG. 4 is a block diagram showing an example of an echo canceller utilizing a conventional subband technique.
Figure 5:
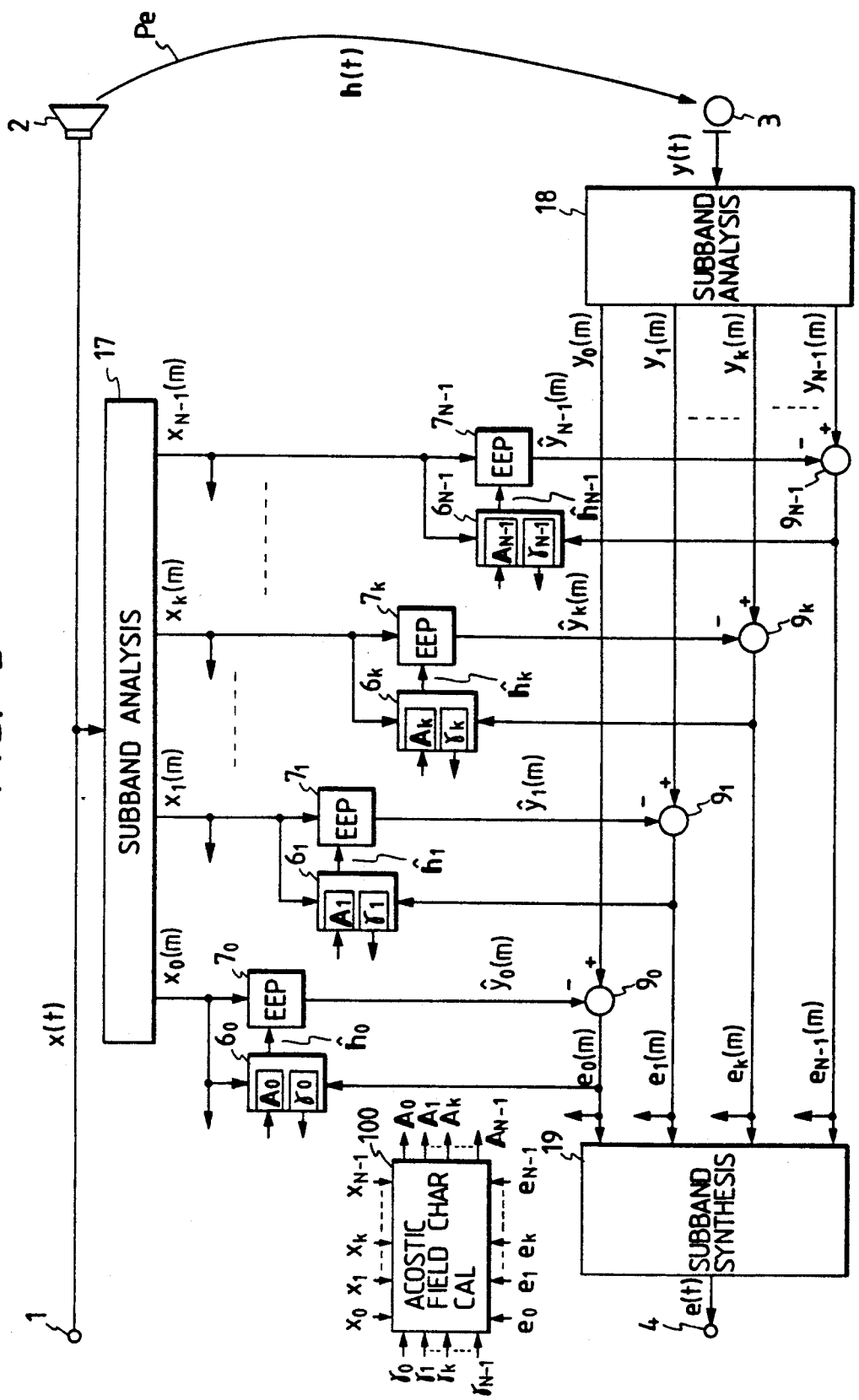
FIG. 5 is a block diagram illustrating a first embodiment of the present invention.

FIG. 5 illustrates in block form a first embodiment of the present invention, in which the parts corresponding to those in FIGS. 1 and 4 are identified by the same reference numerals.

The received input signal x(t) is analyzed or divided by the subband analysis circuit 17 into N real signals $x_k(m)$ (k=0, 1, ..., N−1) for different subbands. Similarly, the echo signal y(t) is analyzed or divided by the subband analysis circuit 18 into N real signals $y_k(m)$ for the same subbands as mentioned above. The analysis of the received input signal x(t) and the echo signal y(t) into the subbands is intended to reflect the variation characteristic of the impulse response of the sound field, and to accomplish this object to the full extent, each signal is divided into subbands so that variation in the impulse response in each subband can be regarded substantially the same, though the subbands are not necessarily of an equal bandwidth.

The estimated echo path $7_k$, formed by a digital FIR filter, for example, is provided corresponding to each subband and the output echo replica signal $\hat{y}_k(m)$ from the estimated echo path $7_k$ is supplied to the subtractor $9_k$ in the corresponding subband. The subtractor $9_k$ subtracts the echo replica signal from the echo signal $\hat{y}_k(m)$ in the corresponding subband and provides the resulting residual echo $e_k(m)$ to the subband synthesis circuit 19 and the coefficient calculation part $6_k$.

In this instance, it is necessary that the estimated echo path $7_k$ follow up the temporal variation of the echo path Pe. The impulse response of the estimated echo path $7_k$ or the coefficients of the digital filter $7_k$ in each subband are iteratively calculated by the coefficient calculation part $6_k$ through utilization of, for example, the LMS algorithm, normalized LMS algorithm, affine projection algorithm, or some other algorithm so that the residual echo, $e_k(m)=y_k(m)-\hat{y}_k(m)$, may approach zero. The result of this calculation is provided to the estimated echo path $7_k$ to adjust it, by which an optimum echo cancellation is maintained at all times.

The residual echo signals $e_k(m)$ in the respective subbands are combined or synthesized by the subband synthesis circuit 19 into the residual echo signal e(t) of the full band.

Figure 6:
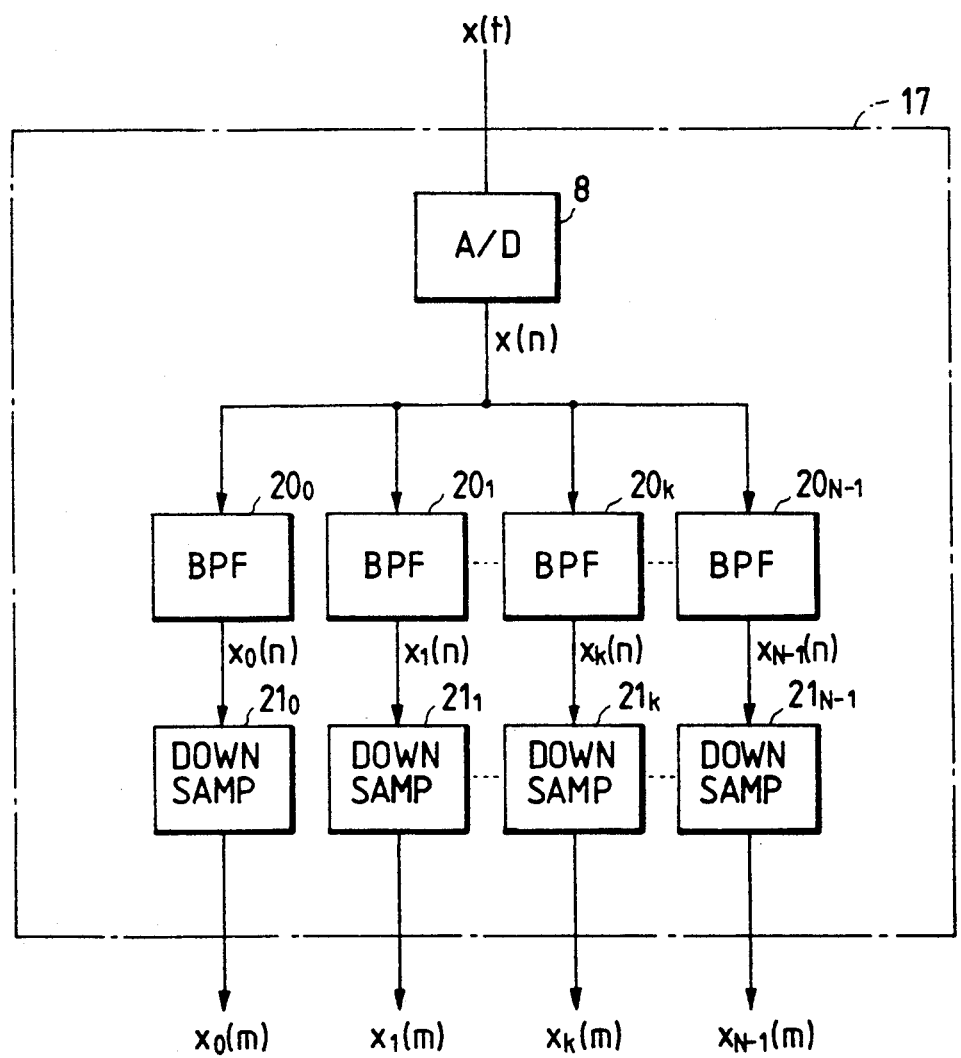
FIG. 6 is a block diagram showing the construction of a subband analysis circuit 17.

FIG. 6 illustrates the internal construction of the subband analysis circuit 17. The received input signal x(t) is sampled by the A/D converter 8 and the sampled outputs are each band-limited by the corresponding band pass filter $20_k$. The band-limited signal $x_k(n)$ is down-sampled by a down sampling circuit $21_k$ by a factor M into $x_k(m)$ to extract every mth sample.

Figure 2:
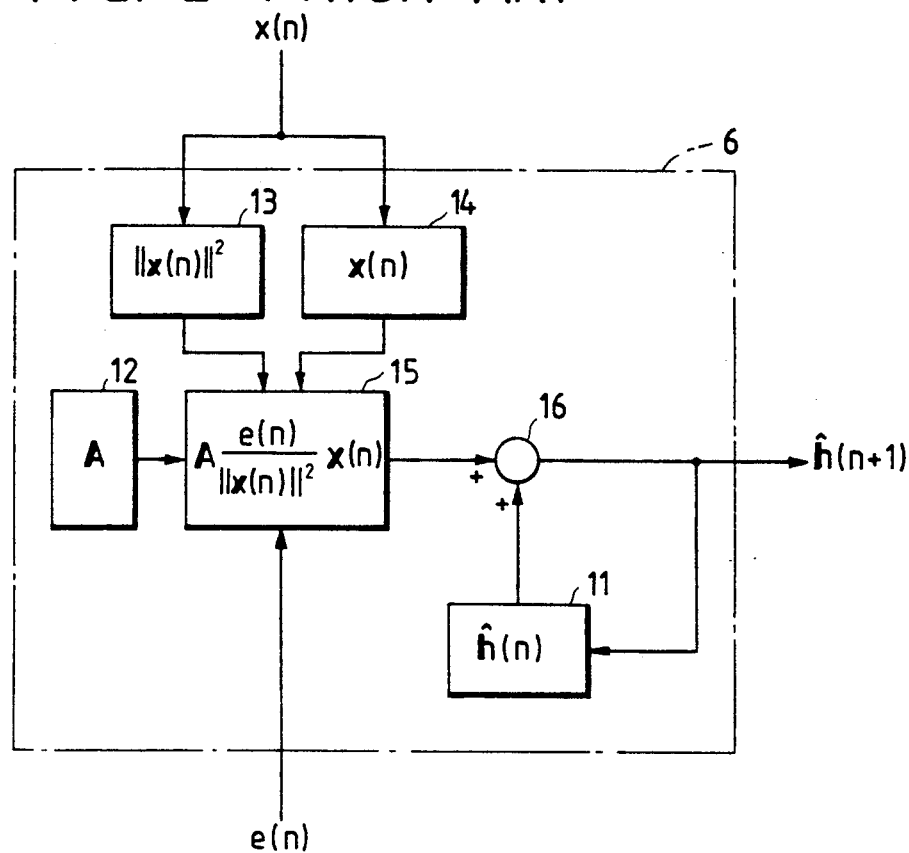
FIG. 2 is a block diagram showing, by way of example, the construction of a coefficient calculation part 6 in FIG. 1.
Figure 3:
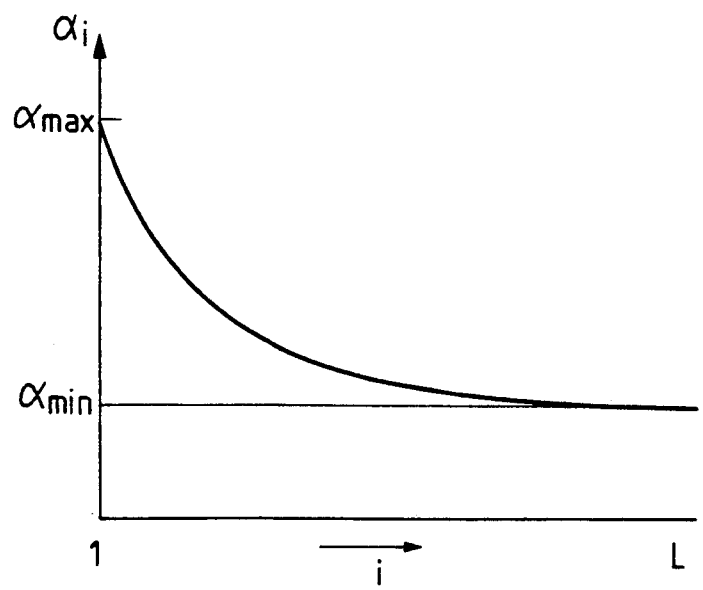
FIG. 3 is a graph showing a diagonal element $\alpha_i$ of a step size matrix A.
Figure 7:
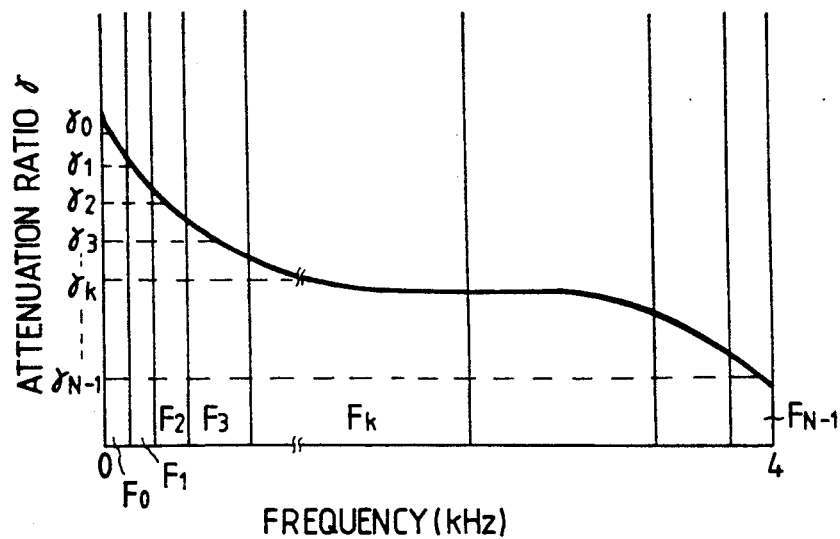
FIG. 7 is a graph for explaining a method of the subband analysis technique.

As referred to previously wit to FIGS. 2 and 3, the amount of variation in the impulse response of the room echo path Pe attenuates exponentially. In this embodiment the subband $F_k$ is determined so that the attenuation ratio $\gamma$ of the amount of impulse response variation of the echo path Pe may become of substantially the same width of variation as shown in FIG. 7, for example, and the mean attenuation ratio in each subband, for instance, is determined to be the attenuation ratio $\gamma_k$ of the subband.

Figure 8:
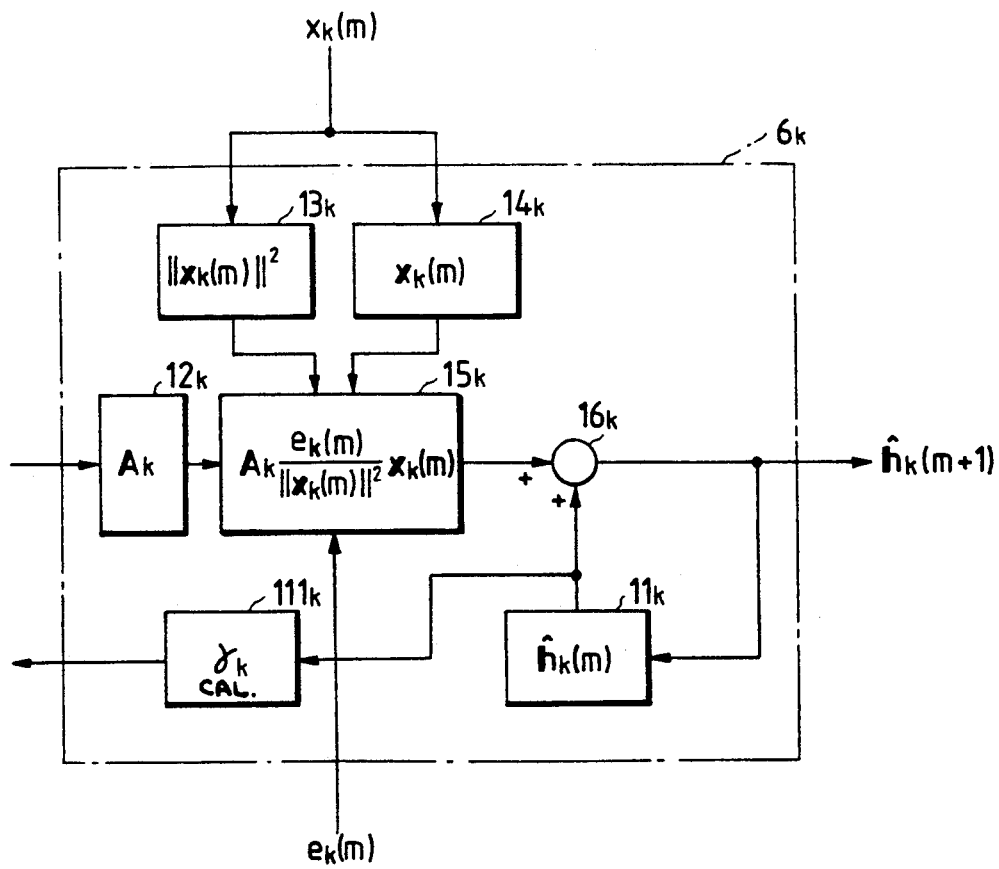
FIG. 8 is a block diagram showing an example of the construction of a coefficient calculation part $6_k$ in a k-th subband.

FIG. 8 illustrates, by way of example, the internal construction of the coefficient calculation part $6_k$ of the k-th subband which employs the ES algorithm. A series of received input signals $x_k(m)$ equal in number to the filter order of the digital filter $7_k$ are prestored as received input signal vectors $x_k(m)$ in the received input signal storage $14_k$, and upon each write of the latest received input signal sample thereinto, the oldest received input signal sample is discarded. Also in the norm calculator $13_k$, $||x_k(m)||^2$ is calculated for the sequence of received input signals $x_k(m)$ of the number equal to the filter order. In the step size matrix storage $12_k$ is stored the step size matrix $A_k$ which is a diagonal matrix and which is characteristic of the present invention. The step size matrix $A_k$ is weighted by the variation characteristic Of the impulse response of the echo path in the corresponding subband. In the case where the echo path Pe is formed in an ordinary room, the amount of variation in the impulse response in the k-th subband is represented as an exponential function using the attenuation ratio $\gamma_k$.

The received input signal vector $x_k(m)$, its squared norm $||x_k(m)||^2$, the residual echo signal $e_k(m)$ and the step size matrix $A_k$ are provided to the adjustment value calculation part $15_k$ to calculate $$A_k \frac{e_k(m)}{||x_k(m)||^2} x_k(m) \tag{6}$$

The calculated output is applied, as adjusting values, to the adder $16_k$, wherein it is added to the current filter coefficients $\hat{n}_k(m)$ being held in the filter coefficient storage $11_k$, thus obtaining new coefficients $\hat{n}_k(m+1)$. The result of this calculation, $\hat{n}_k(m+1)$ is output, as adjusted filter coefficients, to the estimated echo path $7_k$, and at the same time, it is used to update the stored contents of the filter coefficient storage $11_k$.

By the above operations, the estimated echo path $7_k$ is iteratively adjusted following the equation (7) given below, and as a result, the impulse response of the estimated echo path $7_k$ (i.e. the filter coefficients of the digital filter $7_k$) $\hat{n}_k(m)$ approaches the impulse response $h_k(m)$ of the true or actual echo path Pe.

$$\hat{n}_k(m+1) = \hat{n}_k(m) + A_k \frac{e_k(m)}{||x_k(m)||^2} x_k(m) \quad (7)$$

In the above, $A_k = \text{diag}[\alpha_{k1}, \alpha_{k2}, \ldots, \alpha_{kL}]$: step size matrix in the k-th subband $$\alpha_{ki} = \alpha_{k0}\gamma_k^{i-1}(i=1,2,\ldots,L_k) \quad (8)$$

$\gamma_k$: attenuation ratio of the amount of variation of the impulse response variation in the k-th subband $L_k$: filter order in the k-th subband which may be determined as desired in accordance with any known method $$\overline{\alpha}_k = \frac{1}{L_k} \sum_{i=1}^{L_k} \alpha_{ki} \quad (9)$$

$$0 < \alpha_{ki} < 2 \quad (10)$$

Figure 9A:
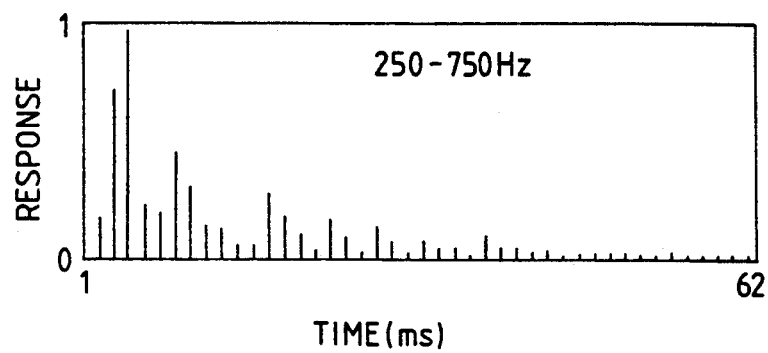
FIG. 9A is a graph showing an example of the impulse response in a low subband.
Figure 9B:
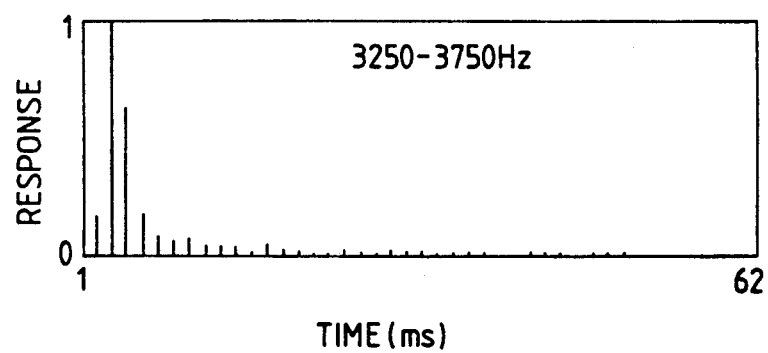
FIG. 9B is a graph showing an example of the impulse response in a high subband.

$\hat{n}_k(m) = (\hat{n}_{k1}(m), \hat{n}_{k2}(m), \ldots, \hat{n}_{kL}(m))^T$: impulse response (i.e. the coefficients of the FIR filter) in the k-th subband $e_k(m)$: estimated error in the k-th subband ($=y_k(m) - \hat{y}_k(m)$), i.e. the residual echo $x_k(m) = (x_k(m), x_k(m-1), \ldots, x_k(m-L+1))^T$: received input signal vector in the k-th subband T: transpose of vector FIGS. 9A and 9B show, by way of example, impulse responses in subbands 250 through 750 Hz and 3250 through 3750 Hz, respectively. The impulse response in each subband attenuates exponentially, and as mentioned previously, the variation characteristic of the impulse response following a variation of the echo path also attenuates exponentially. What is more important in the present invention is the feature that the exponent attenuation or decay curve of each impulse response is long at low frequencies (FIG. 9A) and short at high frequencies (FIG. 9B). In other words, the attenuation curve of the impulse response differs with the subbands. Based on this fact, according to the present invention, a different step size matrix $A_k$ for each subband is determined in an acoustic field characteristic calculation part 100 as described below.

Figure 10:
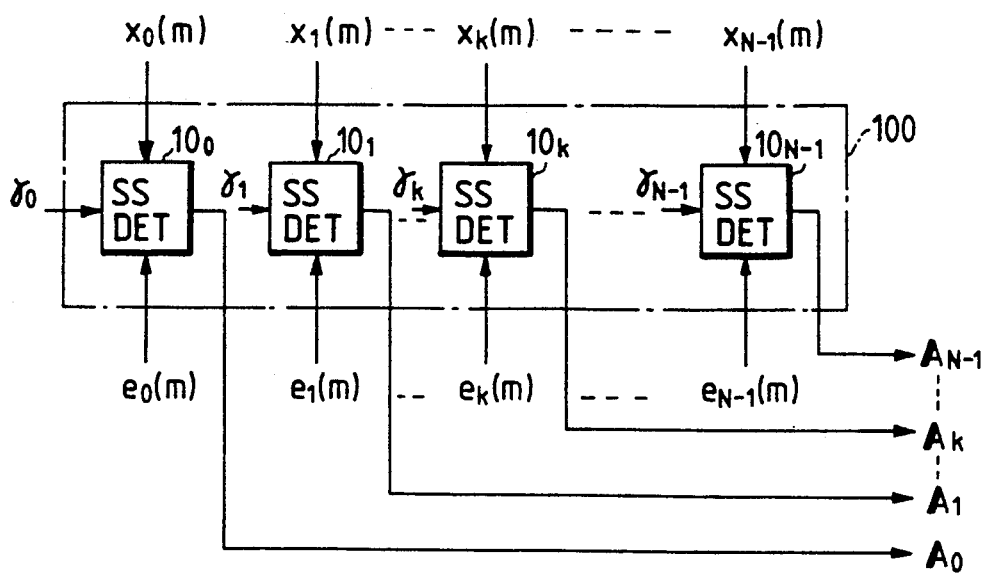
FIG. 10 is a block diagram showing the construction of an acoustic field characteristic calculation part 100.

As shown in FIG. 10, the acoustic field characteristic calculation part 100 includes step size determination parts $10_0$ through $10_{N-1}$ corresponding to the respective subbands and determines the step size matrix $A_k$, reflecting the variation characteristic of the impulse response in each subband, i.e. the exponential attenuation ratio (the slope) and the amount of variation (the magnitude), on the exponential attenuation ratio $\gamma_k$ and the mean step size $\overline{\alpha}_k$ as mentioned below. The step size matrix $A_k$ thus obtained is provided to the coefficient calculation part $6_k$.

Method 1: At first, a proper initial value ($\alpha_{ki}=1$, for example) is given to the step size matrix $A_k$ for each subband $F_k$ and a white noise signal, for example, is applied, as the received input signal x(t), to the terminal 1 (FIG. 5) to obtain the echo signal y(t) in the microphone 3. Based on these signals, the echo replica signal $\hat{y}_k(m)$ and the residual echo signal $e_k(m)$ are obtained, and the residual echo signal and the received input signal are used to obtain the impulse response of the estimated echo path $\hat{7}_k$ again. This operation is iteratively repeated to perform an adaptive operation so that the residual echo signal $e_k(m)$ may be minimized, by which the impulse response $\hat{n}_k$ of the estimated echo path $\hat{7}_k$ is converged to the true impulse response $h_k$. Since the amount of variation in the impulse response of the echo path also attenuates at the same exponential attenuation ratio as that of the impulse response itself as mentioned previously in respect of the prior art depicted in FIGS. 1 through 3, the attenuation ratio of the impulse response $\hat{n}_k$ of the subband $F_k$ thus estimated is obtained as the exponential attenuation ratio $\gamma_k$ of the variation in the impulse response $h_k$ of the echo path Pe in that subband. The exponential attenuation ratio $\gamma_k$ can be obtained from the impulse response by approximately solving an equation composed of $L_k$ equalities obtainable by substituting into the following equation the values of components $\hat{n}_{k1}, \hat{n}_{k2}, \ldots, \hat{n}_{kL_k}$ of the impulse response obtained as mentioned above:

$$||\hat{n}_{ki}|| = ||\hat{n}_{k0}|| \gamma_k^{i-1} \quad (11)$$

Alternatively, Eq. (11) is modified into the following linear function concerning i and the exponential attenuation ratio $\gamma_k$ can be obtained from its slope log $\gamma_k$.

$$\log||\hat{n}_{ki}|| = \log||\hat{n}_{k0}|| + (i-1)\log\gamma_k \quad (12)$$

Such determination of the exponential attenuation ratio $\gamma_k$ is carried out by an attenuation ratio calculation part $111_k$ in the coefficient calculation part $6_k$ shown in FIG. 8. Thus, the attenuation ratio $\gamma_k$ in Eq. (8) is determined.

Next, the coefficient $\alpha_{k0}$ in Eq. (8) is determined as follows: The true impulse response $h_k$ is changed as by movement of a conference participant and a change in $|e_k|^2/|x_k|^2$ of each subband is obtained. The change in $|e_k|^2/|x_k|^2$ indicates the magnitude of the change in the impulse response in the subband $F_k$. Then, the mean step size $\overline{\alpha}_k$ in the subband in which the change in the impulse response is maximum is set to 1 and the step size $\overline{\alpha}_k$ is set to a smaller value as the change in the impulse response becomes smaller. Obtaining the total sum of both sides of Eq. (8) in connection with $i=1, 2, \ldots, L_k$, the following equation is obtained:

$$\overline{\alpha}_k L_k = \alpha_{k0} \sum_{i=1}^{L_k} \alpha_k^{i-1} \quad (13)$$

Accordingly, $\alpha_{k0}$ is calculated by substituting the thus obtained exponential attenuation ratio $\alpha_k$ and mean step size $\overline{\alpha}_k$ into Eq. (13). Next, $\alpha_{ki}$ in each subband is obtained following Eq. (8) to determine the step size matrix $A_k$ in the subband, which is provided to the coefficient calculation part $6_k$. The step size matrix $A_k$ in each subband, thus determined, need not be updated unless the acoustic field (the conference room, for example) is changed and/or unless the physical condition in the same acoustic field (the number of people in the room, for instance) undergoes a substantial change.

Method 2: The variation characteristics of the impulse response, that is, the exponential attenuation ratio (the slope) and the amount of variation (the magnitude), are measured, by use of Method 1, under various conditions in different rooms of various acoustic characteristics to obtain the exponential attenuation ratio $\gamma_k$ and the mean step size $\overline{\alpha}_k$, from which $\alpha_{k0}$ is computed. Then $\alpha_{ki}$ is obtained following Eq. (8) to determine the step size matrix $A_k$ in each subband, and its standard value is prestored in a ROM and is provided therefrom to the coefficient calculation part $6_k$, for example, when the power source is connected.

By setting the step size matrix $A_k$ for each subband as mentioned above, the frequency characteristics of the amount of variation of the impulse response can be reflected, and hence an echo canceller of high convergence speed can be provided.

Figure 11:
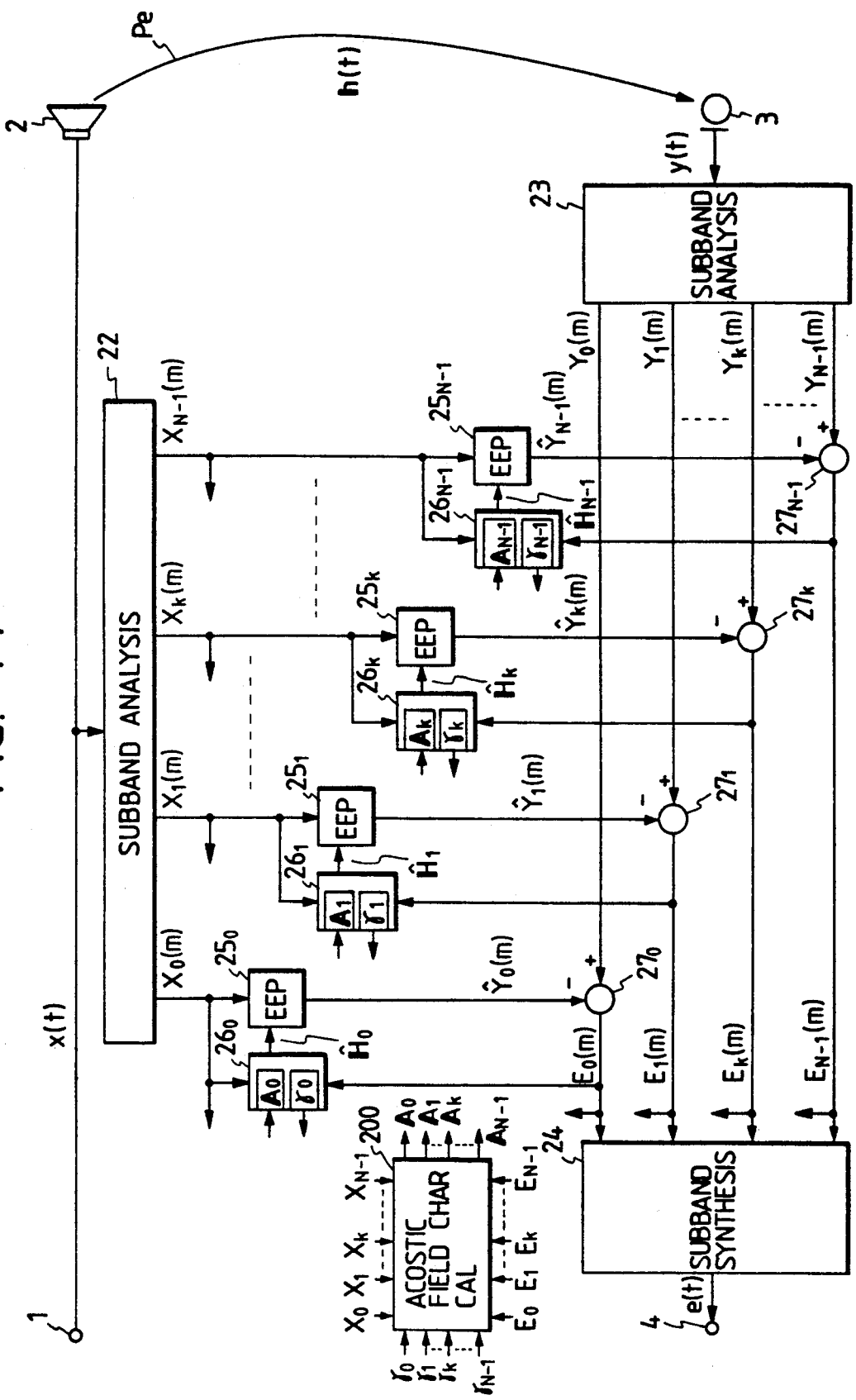
FIG. 11 is a block diagram illustrating a second embodiment of the present invention.

FIG. 11 illustrates a second embodiment of the present invention, which employs a polyphase filter bank for the subband analysis unlike the first embodiment. The use of the polyphase filter bank afford reduction of the computational load. In this instance, the subbands are equally spaced apart and signals $X_k(m)$, $Y_k(m)$ and $E_k(m)$ and the impulse response of the estimated echo path or coefficients of the FIR filter $\hat{H}_k(m)$ are represented by complexes.

The received input signal $x(t)$ is analyzed or signals $X_k(m)$ ($k=0, 1, \ldots, N-1$) in different subbands. Similarly, the echo signal $y(t)$ is analyzed or divided by a subband analysis circuit 23 into N complex signals $Y_k(m)$ each corresponding to a different subband. In each subband there is provided an estimated echo path $25_k$ and an echo replica signal $\hat{Y}_k(m)$ from the estimated echo path $25_k$ is subtracted by a subtractor $27_k$ from the echo signal $Y_k(m)$ to cancel the latter.

The estimated echo path (formed by a complex FIP filter) $25_k$ has to follow up the temporal variation of the echo path Pe. The estimated echo path $25_k$ is iteratively estimated and hence adjusted by a coefficient calculation part $26_k$ through use of a complex LMS algorithm, complex normalized LMS algorithm, or similar algorithm so that the residual echo, $E_k(m)=Y_k(m)-\hat{Y}_k(m)$ may be reduced toward zero. Thus, an optimum echo cancellation is always maintained.

The residual echo signals $E_k(m)$ in the respective subbands are combined or synthesized by a subband synthesis circuit 24 into a full-band signal $e(t)$. This analysis-synthesis process can efficiently be performed by use of an N-point FFT.

Figure 12:
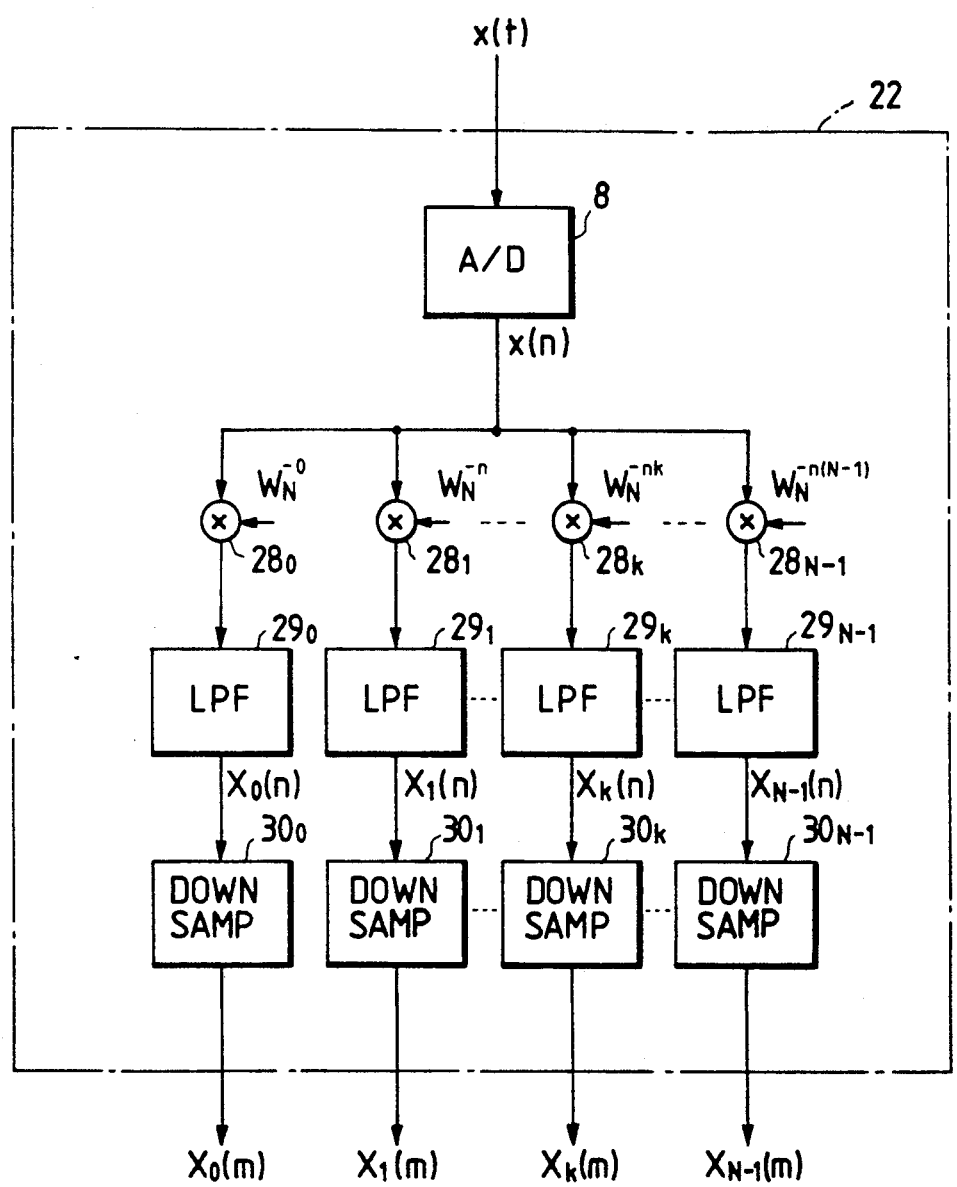
FIG. 12 is a block diagram showing the construction of a subband analysis circuit 22 in FIG. 11.
Figure 13:
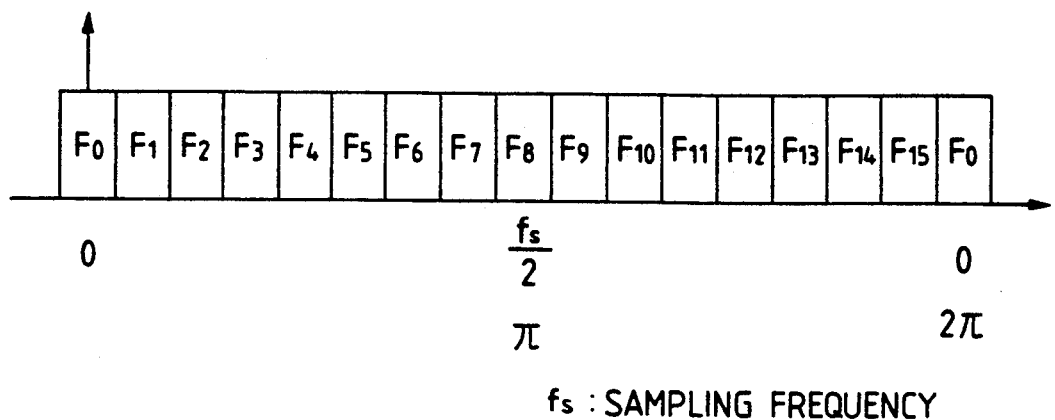
FIG. 13 is a diagram showing an example of subband signals.

FIG. 12 illustrates the construction of the subband analysis circuit 22, in which the received input signal $x(t)$ is sampled by the A/D converter 8, multiplied by $W_N^{-nk}=\exp(-j2nk\pi/N)$ in a multiplier $28_k$ in each subband and band-limited by a low pass filter $29_k$ of the subband ($-\pi/N, \pi/N$), whereby the received input signal is analyzed or divided into N subbands $F_0$ through $F_{N-1}$. The band-restricted signal $X_k(n)$ is down-sampled by a down sampling circuit $30_k$ by a factor M into $X_k(m)$. The factor M may be selected as desired within technical limitations known in this field. The subband signals $X_0(m)$ through $X_{N-1}(m)$ each correspond to a short-time spectrum. FIG. 13 shows the subbands when $N=16$. Of the 16 subband signals $X_0(m)$ through $X_{15}(m)$, the signals $X_0(m)$ and $X_8(m)$ are real and the others are complex. The subbands ($F_7$ and $F_9$, for example), which are symmetrical with respect to the subband $F_8$, bear a complex conjugate relationship to each other, and consequently, the full-band signal could be synthesized, if a total of nine (two real and seven complex) subband signals are available.

Figure 14:
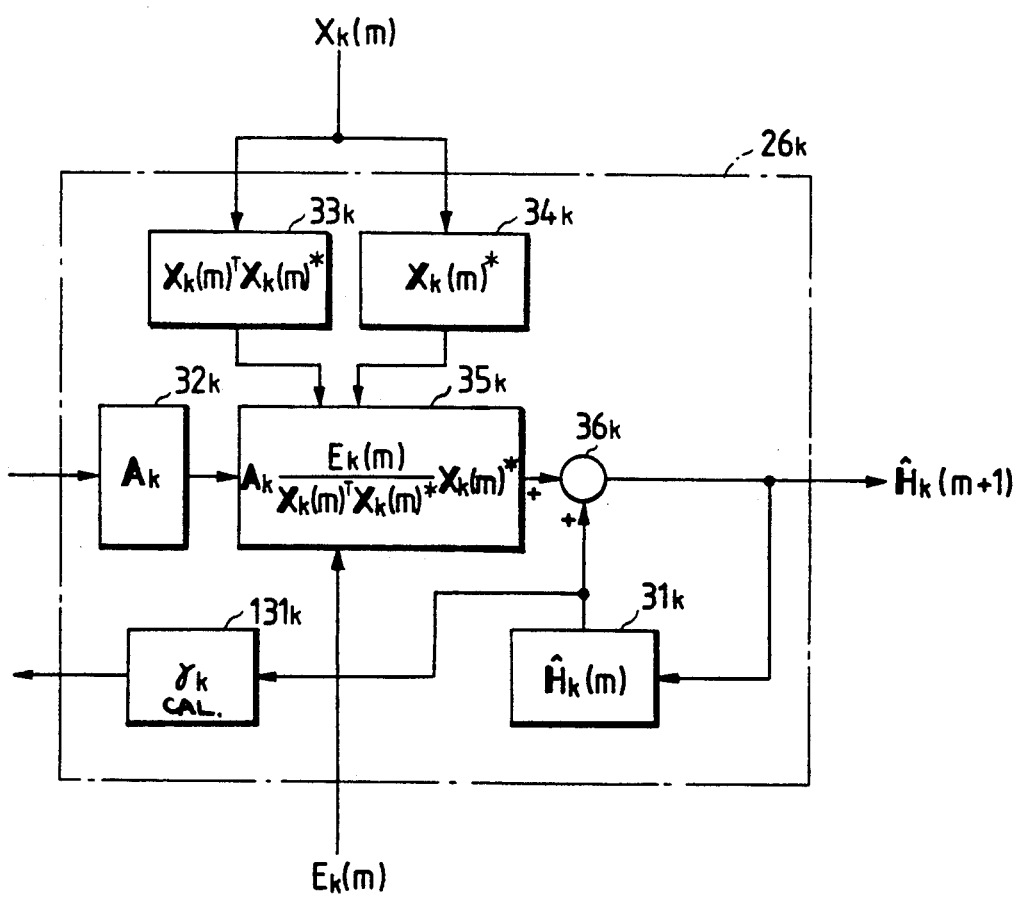
FIG. 14 is a block diagram showing an example of the construction of a coefficient calculation part $26_k$ in the k-th subband.

FIG. 14 illustrates, by way of example, the construction of the coefficient calculation part $26_k$ in the k-th subband which employs a complex ES algorithm. The received input signal $X_k(m)$ is written, as a received input signal vector $X_k(m)^*$, into a received input signal storage $34_k$ and, at the same time, $X_k(m)^T X_k(m)^*$ is computed by a norm calculator $33_k$. In a step size matrix storage $32_k$ is stored the step size matrix $A_k$. The step size matrix $A_k$ is weighted by the variation characteristic of the impulse response in the corresponding subband. As described previously, when the echo path is formed in an ordinary room, the amount of variation of the impulse response in the k-th subband is represented as an exponential function using the attenuation ratio $\gamma_k$.

The $X_k(m)$ and $X_k(m)^T X_k(m)^*$, $E_k(m)$ and $A_k$ are supplied to an adjusting value calculation part $35_k$ to calculate $$A_k \frac{E_k(m)}{X_k(m)^T X_k(m)^*} X_k(m)^* \quad (14)$$

The calculated output is supplied to an adder $36_k$, in which it is added to the filter coefficients $\hat{H}_k(m)$ from a filter coefficient storage $31_k$ to obtain adjusted coefficients $\hat{H}_k(m+1)$. The result of the calculation, $\hat{H}_k(m+1)$, is provided to the estimated echo path $25_k$ and, at the same time, it is used to update the stored contents of the filter coefficient storage $31_k$.

By the above operations, the estimated echo path $25_k$ is iteratively adjusted in accordance with following Eq. (15) and the impulse response $\hat{H}_k(m)$ of the estimated echo path $25_k$ approaches the impulse response $H_k(m)$ of the true echo path Pe.

$$H_k(m+1) = H_k(m) + A_k \frac{E_k(m)}{X_k(m)^T X_k(m)} X_k(m)^* \quad (15)$$

In the above,
$A_k = \mathrm{diag}[\alpha_{k1}, \alpha_{k2}, \ldots, \alpha_{kL}]$: step size matrix in the k-th subband $$\alpha_{ki} = \alpha_{k0} \cdot \gamma_k^{i-1} (i=1,2,\ldots,L_k) \quad (16)$$

$\gamma_k$: attenuation ratio of the amount of variation of the impulse response in the k-th subband $L_k$: filter order (i.e. the number of taps of the filter) in the k-th subband $\hat{H}_k(m) = (\hat{n}_{k1}(m), n_{k2}(m), \ldots, \hat{n}_{kL}(m))^T$: impulse response of the estimated echo path (i.e. coefficients of the FIR filter) in the k-th subband $E_k(m)$: residual echo ($=Y_k(m)-\hat{Y}_k(m)$) in the k-th subband $X_k(m) = (X_k(m), X_k(m-1), \ldots, X_k(m-L+1))T$: received input signal vector in the k-th subband

*: complex conjugate

T: transpose of vector

Figure 15:
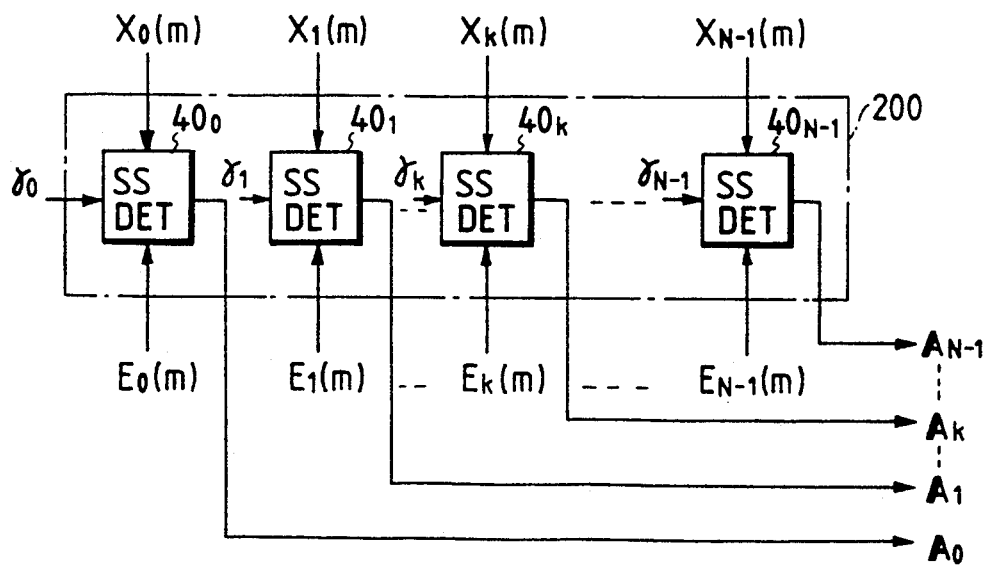
FIG. 15 is a block diagram showing the construction of an acoustic field characteristic calculation part 200.

FIG. 15 illustrates the internal construction of the acoustic field characteristic calculation part 200, which includes step size determination parts $40_0$–$40_{N-1}$ each of which determines the step size matrix $A_k$, reflecting the variation characteristic of the impulse response in each subband, that is, the exponential attenuation ratio (the slope) and the amount of variation (the magnitude), on the exponential attenuation ratio $\gamma_k$ and the mean step size $\bar{\alpha}_k$. The step size matrix $A_k$ thus determined is provided to the coefficient calculation part $26_k$. This processing is similar to that used in the FIG. 5 embodiment, and hence it will be described in brief.

Method 1: At first a proper initial value ($\alpha_{ki}=1$, for instance) is given to the step size matrix $A_k$ and an adaptive operation of the estimated echo path $25_k$ in each subband is performed, by which the impulse response $\hat{H}_k$ of the estimated echo path $25_k$ is converged to the true impulse response $\hat{H}_k$. The attenuation ratio of the impulse response $H_k$ thus estimated is obtained, as the exponential attenuation ratio $\gamma_k$ of the impulse response of the echo path Pe in that subband, in an attenuation ratio calculation part $131_k$.

Next, the true impulse response $H_k$ is caused to vary by a movement of a conference participant, for example, and a change in $||E_k||^2/||X_k||^2$ at that time is obtained. This change represents the magnitude of a change of the impulse response in each subband. In view of this, the mean step size $\alpha_k$ in the subband of the maximum impulse response variation is set to 1 and the mean step size $\alpha_k$ is set to smaller values in the order of subbands in which the impulse response variation becomes smaller. Based on the attenuation ratio $\gamma_k$ and the mean step size $\alpha_k$ obtained, $\alpha_{k0}$ is obtained and $\alpha_{ki}$ is obtained following Eq. (16). The step size matrix $A_k$ in each subband, thus determined, is provided to the coefficient calculation part $26_k$.

Method 2: The variation characteristics of the impulse response (the exponential attenuation ratio (the slope) and the amount of variation (the magnitude)) is measured, by use of Method 1, under various conditions in different rooms of various acoustic characteristics to obtain the exponential attenuation ratio $\gamma_k$ and the mean step size $\alpha_k$, from which $\alpha_{k0}$ is computed. Then $\alpha_{ki}$ is obtained following Eq. (16) to determine the step size matrix $A_k$ in each subband, and its standard value is prestored in a ROM, from which it is applied to the coefficient calculation part $26_k$, for example, when the power source is connected.

Also in this embodiment, the step size matrix $A_k$ is set for each subband, by which the frequency characteristics of the attenuation ratio of the amount of impulse response variation can be reflected on the exponential attenuation ratio $\gamma_k$ and the mean step size $\alpha_k$, and hence it is possible to offer an echo canceller of high convergence speed.

Figure 16:
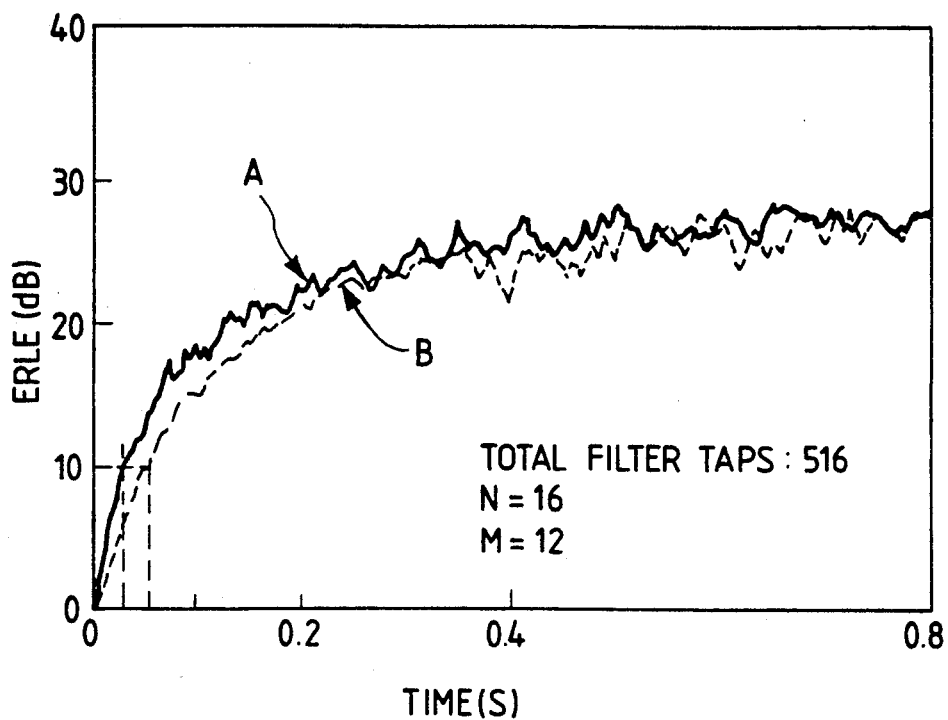
FIG. 16 is a graph showing the results of simulation of the process of convergence for a white noise signal input in the present invention and in the conventional ES algorithm.

FIG. 16 shows the results of computer simulations of the convergence performance of the second embodiment. The measured impulse response (516 taps, sampling frequency $f_s = 8$ kHz) was analyzed into 16 Subbands and down-sampled by a factor $M = 12$. The received input signal used was a white noise signal. The echo signal was added with near end noise so that the SN ratio might be 30 dB.

The solid line A indicates the convergence characteristic obtained with the present invention and the broken line B the convergence characteristic obtained with the prior art employing the ES algorithm as depicted in FIGS. 1 through 3. With the prior art method, the convergence speed is maximum when $\alpha = 1$. In the computer simulations, $\alpha_k = 0, 1, \ldots, N-1$) was set to 1 in the method of the present invention and $\alpha$ was set to 1 in the prior art method so that the equal steady-state ERLE might be obtained when the convergence speed was maximum.

From FIG. 16 it can be seen that the convergence time for the echo return loss enhancement to reach 10 dB is reduced to about 60% of the convergence time in the prior art method. Since the echo path often varies owing to movement of people in the hands-free telecommunication system, a rapid adaptation to such variation is a great advantage.

Figure 17:
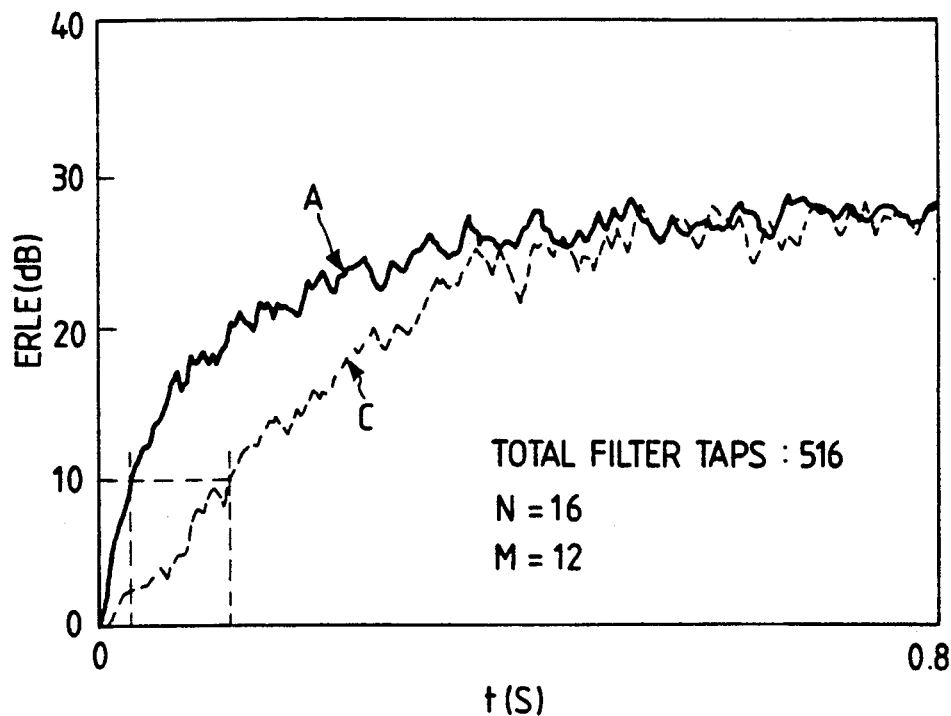
FIG. 17 is a graph showing the results of simulation of the process of convergence for a white noise signal input in the present invention and in the conventional subband method.

FIG. 17 shows, in comparison, the result A of the compute simulation for the ERLE by the present invention depicted in FIG. 16 and the result C of computer simulation for the ERLE by the conventional subband method described previously with respect to FIG. 4.

Also in this case, a white noise signal was used as the received input signal. In the simulation for the prior art the step size $\alpha$ was set to 1 in all the subbands. In the case of the curve A, the time necessary for the ERLE to reach 10 dB is around 25% of the time needed in the case of the prior art indicated by the curve C—this indicates that the present invention is advantageous over the prior art.

Figure 18:
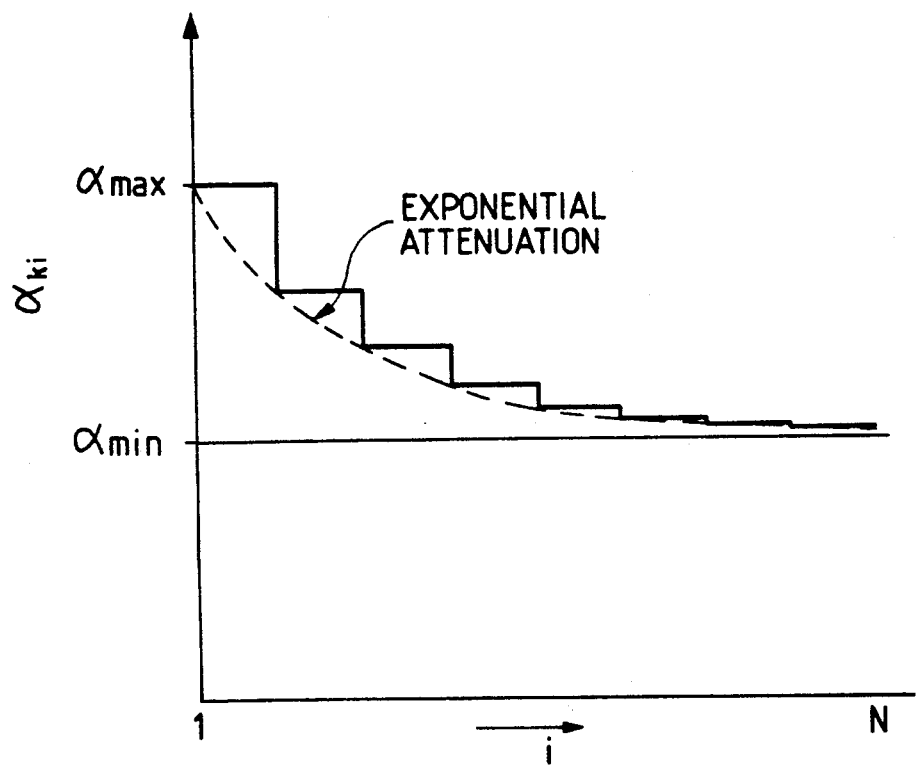
FIG. 18 is a graph showing, by way of example, the case of setting the diagonal element $\alpha_i$ of the step size matrix in an approximated stepwise form.

While in the above the present invention has been described in connection with the case where the amount of variation of the impulse response in an acoustic field has an exponential attenuation characteristic, some other arbitrary variation characteristic may also be employed. Moreover, an impulse response variation characteristic approximated stepwise as shown in FIG. 18, for example, may also be set as the diagonal element $\alpha_{ki}$ of the step size matrix.

Although the digital filter has been described to be an FIR filter, some other digital filters may be utilized Furthermore, the algorithm used has been described to be the ES algorithm, but some other algorithms may be used. The present invention may also be used with an arbitrary gradient type adaptive algorithm which is expressed by the following equation (17) and adds an adjusting term $A\hat{n}(m)$ to coefficients $\hat{n}(m)$ for iterative adjustment.

$$\hat{n}(m+1) = \hat{n}(m) + A\Delta\hat{n}(m) \tag{17}$$

In this instance, the step size needs only to be determined in accordance with the magnitude of variation of the estimated parameter which is caused by the impulse response variation characteristics.

As described above, according to the present invention, since the frequency characteristics of the amount of variation of the impulse response is reflected on the exponential attenuation ratio and the mean step size, if the present invention is applied to the conventional echo canceller of ES algorithm, the convergence time needed can be reduced to about 60%, and if the present invention is applied to the conventional subband echo canceller, the convergence time needed can be reduced to about 25%. Hence, the speech quality is improved accordingly.

It will be apparent that many modifications and variations may be effected without departing from the scope of the novel concepts of the present invention.

What is claimed is:

1. An echo canceller comprising:
   first subband analysis means wherein a received input signal to be provided on an echo path is analyzed into N subbands, N being an integer equal to or greater than 2;
   N estimated echo path means formed by digital filters through which said N subband-analyzed received input signals are passed to obtain N subband echo replica signals;
   second subband analysis means wherein an echo signal resulting from the transmission of said received input signal via said echo path is analyzed into said N subbands;
   N subtracting means which subtract, from said N subband-analyzed echo signals, corresponding ones of said N subband echo replica signals to obtain N subband residual echo signals;
   subband synthesis means for synthesizing said N subband residual echo signals into a full band residual echo signal; and N coefficient calculation means each supplied with one of said N subband received input signals and that one of said N subband residual echo signals corresponding thereto, for calculating coefficients of one of said N digital filters, said coefficients of said N digital filters being provided to said N estimated echo paths;

said coefficient calculation means in each subband being operative to iteratively calculate values for adjusting said coefficients of said digital filter of each subband by a series of step sizes predetermined in accordance with exponential attenuation characteristics of an impulse response of said echo path in each subband, and being operative to adjust said coefficients on the basis of said adjusting values and to provide said adjusted coefficients to said digital filter, whereby an impulse response of said estimated echo path in each subband, formed by said digital filter, is caused to approach said impulse response to said echo path in said subband to thereby minimize said residual echo signal in said subband.

2. The echo canceller of claim 1, further comprising an acoustic field characteristics calculation part which extracts said exponential attenuation characteristic of said impulse response of said echo path in said each subband from said N subband-analyzed received input signals and said residual echo signals from said N subtracting means and determines said series of step sizes, based on said extracted exponential attenuation characteristics.

3. The echo canceller of claim 1 or 2, wherein said first and second subband analysis means each include N band pass filter means for providing said N subbands so that change in the attenuation ratio of said impulse response of said echo path may be substantially constant.

4. The echo canceller of claim 1 or 2, wherein said coefficient calculation means in each subband includes: step size storage means for holding said series of step sizes; input signal storage means for holding a predetermined number of received input signals in said subband; norm calculation means for calculating a squared norm of said predetermined number of received input signals; adjusting value calculation means wherein the product of said step sizes, said residual echo signal and said received input signals is divided by said squared norm to obtain said adjusting values; coefficient storage means for holding the current values of said coefficients; and adder means for adding said adjusting values to said coefficients from said coefficient storage means to obtain new coefficients.

5. The echo canceller of claim 1 or 2, wherein said digital filter in each subband is an FIR filter.

6. The echo canceller of claim 4, wherein, letting said attenuation ratio of said amount of variation of said impulse response of said echo path in a k-th one of said N subbands and the filter order of said digital filter in said k-th subband be represented by $\gamma_k$ and $L_k$, respectively, a series of $L_k$ step sizes in said k-th subband are expressed as follows:

$$\alpha_{ki} = \alpha_{k0} \cdot \gamma_k^{i-1}, \text{ where } i=1,2,\ldots,L_k.$$

7. The echo canceller of claim 6, wherein, letting said series of $L_k$ step sizes in said k-th subband, $L_k$ sample values of said received input signal in said k-th subband, said residual echo signal in said k-th subband and said coefficients of said digital filter of $L_k$ taps be represented by a diagonal matrix $A_k = \text{diag}[\alpha_{k1}, \alpha_{k2}, \ldots, \alpha_{kL_k}]$, a received signal vector $x_k(m)$, $e_k(m)$ and $\hat{n}_k(m)$, respectively, said coefficient calculation means calculates said adjusted coefficients $\hat{n}_k(m)$ by the following equation $$\hat{n}_k(m+1) = \hat{n}_k(m) + A_k \frac{e_k(m)}{||x_k(m)||^2} x_k(m)$$

and provides said adjusted coefficients to said digital filter and updates the contents of said coefficient storage means.

8. The echo canceller of claim 1 or 2, wherein said first and second subband analysis means each include N polyphase filter means for providing N subbands of the same width and divide said received input signal and said echo signal into N complex received input signals and N complex echo signals, respectively, and said estimated echo path in said k-th subband is formed by a complex digital filter having $L_k$ taps which are supplied with $L_k$ complex coefficients.

9. The echo canceller of claim 8, wherein said complex digital filter in each subband is a digital complex FIR filter.

10. The echo canceller of claim 8, wherein said coefficient calculation means in said k-th subband includes: step size storage means for holding said series of step sizes; input signal storage means for holding $L_k$ complex received input signals in said subband; norm calculation means for calculating the norm of said $L_k$ complex received input signals; adjusting value calculation means wherein the product of said steps sizes, said residual echo signal and said complex received input signals is divided by said norm to obtain said adjusting values in a complex form; coefficient storage means for holding the current value of said complex coefficients; and adder means for adding said complex adjusting values to said complex coefficients from said coefficient storage means to obtain new complex coefficients.

11. The echo canceller of claim 10, wherein, letting said attenuation ratio of said amount of variation of said impulse response of said echo path in said k-th subband be represented by $\gamma_k$, said $L_k$ step sizes in said k-th subband is expressed as follows:

$$\alpha_{ki} = \alpha_{k0} \cdot \gamma_k^{i-1}, \text{ where } i=1,2,\ldots,L_k.$$

12. The echo canceller of claim 11, wherein, letting said series of $L_k$ step sizes in said k-th subband, $L_k$ sample values of said complex received input signals in said k-th subband, said complex residual echo signal in said k-th subband and said complex coefficients of said complex digital filter of $L_k$ taps be represented by a diagonal matrix $A_k = \text{diag}[\alpha_{k1}, \alpha_{k2}, \ldots, \alpha_{kL_k}]$, a complex received input signal vector $x_k(m)$, $E_k(m)$ and $\hat{H}_k(m)$, respectively, said coefficient calculation means calculate said adjusted complex coefficients $\hat{H}_k(m+1)$ by the following equation $$\hat{H}_k(m+1) = \hat{H}_k(m) + A_k \frac{E_k(m)}{X_k(m)^T X_k(m)^*} X_k(m)^*$$

where T represents the transpose of vector and * represents a complex conjugate, said coefficient calculation means providing said adjusted complex coefficients to said digital filter and updating the contents of said coefficient storage means.

13. The echo canceller of claim 1 or 2, wherein, letting said adjusted values, said step size matrix and said current values of said coefficients in said each subband be represented by $\Delta\hat{n}(m)$, A and $\hat{n}(m)$, respectively, said coefficient calculation means calculates coefficients $\hat{n}(m+1)$ adjusted by the following equation $$\hat{n}(m+1) = \hat{n}(m) + A\Delta\hat{n}(m)$$

and provides said adjusted coefficients to each tap of said digital filter in each subband.

* * * * *